United States Patent [19]

Narodny

[11] 3,886,544

[45] May 27, 1975

[54] KEYBOARD USING OPTICAL SWITCHING

[76] Inventor: Leo H. Narodny, Martin's Bay, St. John, Barbados, British W. Indies

[22] Filed: June 12, 1974

[21] Appl. No.: 478,509

[52] U.S. Cl. ............ 340/365 P; 350/96 B; 240/1 LP
[51] Int. Cl. ............ H04l 15/06
[58] Field of Search ............ 340/365 P

[56] References Cited

UNITED STATES PATENTS 3,603,982 9/1971 Patti ............ 340/365 P
3,614,402 10/1971 Higgins ............ 340/365 P

*Primary Examiner*—Thomas B. Habecker
*Attorney, Agent, or Firm*—Morton, Bernard, Brown, Roberts & Sutherland

[57] ABSTRACT

The invention relates to keyboard devices using optical switching and includes novel light distribution means to multiple fiber optics, switching means between fiber optics, and collection means from multiple fiber optics to a single point.

2 Claims, 32 Drawing Figures

Patented May 27, 1975 3,886,544
8 Sheets-Sheet 2
FIG. 6.
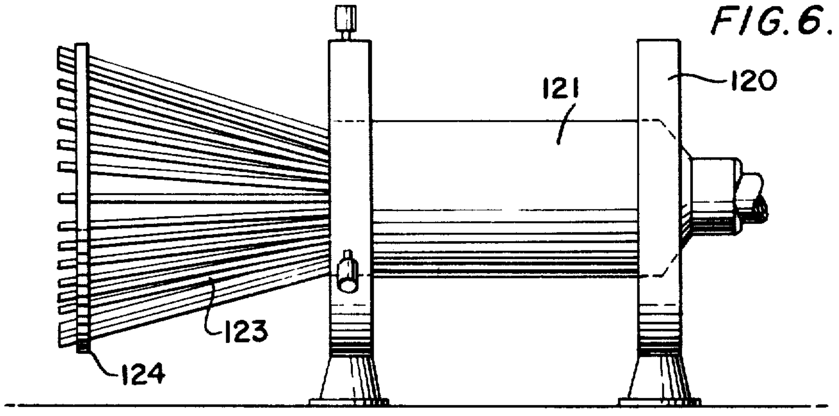
FIG. 7.
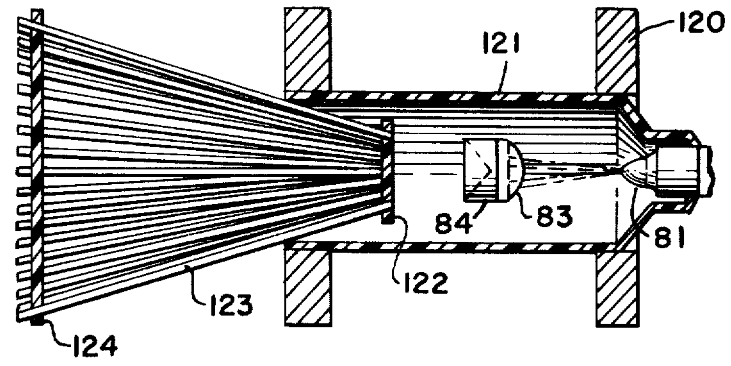
FIG. 9.
FIG. 8.
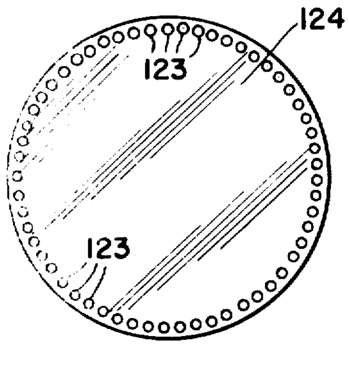
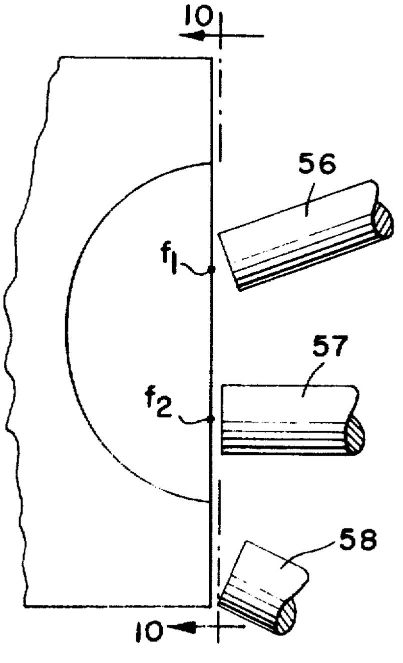
FIG. 10.
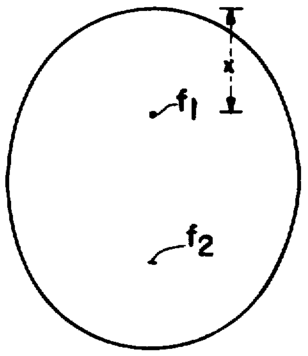

KEYBOARD USING OPTICAL SWITCHING

INDEX

Cross-Reference to Related Application
Abstract of the Disclosure
Field of Invention
Description of Prior Art
Summary of Invention
Description of Drawings
Description of Elements
General Description
The Axiconic Light Distributor
Preferred Embodiments
Light Distributor and Collector
Reflector Switch
Description of Alternatives
The Distributor and Collector System
The Reflector Switch
Specific Example I
Specific Example II
Claims

CROSS-REFERENCE TO RELATED APPLICATION

This application claims the priority of my prior patent application entitled Keyboard Using Optical Switching, filed June 15, 1973, Ser. No. 370,450.

FIELD OF INVENTION

This invention relates to light transmission and more particularly, multiple light transmission from a single source and collection from multiple sources to a single point. Specific applications include keyboard for a computer or a telecommunication, particularly remote keyboard devices, multiple illumination for instrumentation and sensing, and signalling and monitoring.

DESCRIPTION OF PRIOR ART

A conventional means of actuating keyboards, whether an electric typewriter or a computer terminal, is today a make-and-break electrical circuit. This circuit, in the electric typewriter, has the advantage of simplicity but the disadvantage of non-reliability. A typical modern keyboard for a computer insulates the make-and-break circuit for each character key within a vacuum thus greatly increasing reliability, but likewise substantially increasing the cost.

An early disclosure of optical circuits is the 1939 patent, of D. A. Roberts U.S. Pat. No. 2,168,886, showing rotatable prisms attached to keys which keys deflect light in air down a tube to a photocell.

The 1970 Patent of R. A. Shurtliff U.S. Pat. No. 3,516,529, discloses multiple channels of light in air shining on associated photo tubes. Each key selectively blocks one or more channels of light when depressed, thus creating the desired coded signal.

The 1971 Patent of W. C. Leone, et al., U.S. Pat. No. 3,581,003, discloses a keyboard with coded output using fiber optics. In the first variation, a code for all characters in sequences is continuously generated and selectively released by depressing the key. In the second variation, the key depression activates its channel and the light is directed onto a coded screen and read by an extended photo electric sensor.

The optical switch for this keyboard also has two variations. The simpler one is an interrupted fiber optic with a mask blocking the light channel when the key is in a normal position and removed from the channel when the key is depressed. The second variation is also an interrupted fiber optic in which the ends are parallel and a semi-circular fiber optic portion caps the two ends when the key is depressed, thus transmitting the light.

The conventional means of directing a light source to a bundle of fiber optics is disclosed in 1971 Patent of W. Pabst U.S. Pat. No. 3,565,524. The means is simply a focusing lens directed on the bunched optical fibers.

Another system for distributing light to fiber optics is shown in the 1972 Patent of J. R. Keller, et al., U.S. Pat. No. 3,638,008. A conventional light bulb is mounted at one focal point of an elliptical reflector. A harness holds the bundle of fiber optics directed towards the other focal point on which the rays converge and then diverge. This system collects a substantial portion of the light in the fiber optics and insures fairly uniform illumination but a very large portion of the light is lost.

A conical lens is described in the 1956 Patent of J. J. Mcleod U.S. Pat. No. 2,759,393, and in the Journal of Optical Society of America, Vol. 44, pp. 592–597 (1954). The lens is termed an axicon and it differs from a conventional lens in that one surface, while inclined to the axis is not curved, and therefore the axion forms an image of a point source at a range of points along its axis.

SUMMARY OF INVENTION

This invention of improved light distribution switching and collection means makes practical the use of an optical keyboard.

The present invention, by way of example, allows the distribution of light from an extremely small point source to each of the character and special purpose keys of a keyboard and the collection of that light and selective illumination of photoelectric transducers, creating the required signal for input to the computer.

The elimination of the complex optical systems referenced in the prior art section results in both lower cost and higher reliability, making the optical keyboards using the inventions herein disclosed competitive with the conventional keyboards using wired electronics and circuits.

In an optically actuated keyboard, a single source of light is used to activate, for instance, from 1 to 6 photoelectric transducers, creating a signal indicative of up to 64 characters. In this instance the light source must be of sufficient power to be divided into 64 components, each component of which has sufficient power to operate any one or all of the photoelectric transducers.

Additional power is required for the loss in (a) distributing the light to fiber optics for each of the characaters, (b) transmitting the light to the character key, (c) coupling the light with a switch, (d) transmitting the light to the photoelectric transducers, and (e) directing it onto the photoelectric transducers.

The minimum power of the light is thus 384 times the power required to operate the photoelectric transducer and high losses for the reasons (*a–e*) outlined above, can force the light to be several thousand times that required to operate a photoelectric transducer. It is apparent, therefore, that extremely high efficiency in distribution, transmission, switching and coupling is of prime importance in an optical keyboard.

This application discloses an optical keyboard utilizing fiber optic systems which possess extremely high conductivity with low losses, and further discloses a light distributor using an axicon lens and a light switch using an ellipsoidal reflector.

DESCRIPTION OF DRAWINGS

FIG. 6 is a side elevation view of a light distribution system using an axicon.

FIG. 7 is a view similar to FIG. 6 partially cut away to show the light source and axicon.

FIG. 8 is a front view of the fiber optic harness shown in FIGS. 6 and 7.

FIG. 9 is an enlarged cross-sectional view of the key coupling system of FIG. 4, where $f_1$ and $f_2$are the foci of the ellipsoid.

FIG. 10 is a view taken on lines 10—10 of FIG. 9, showing the ellipsoid reflector in profile.

DESCRIPTION OF ELEMENTS

| Description of Elements | |
|---|---|
| 30 | Terminal |
| 31 | Keyboard |
| 32 | Character keys |
| 33 | Special purpose keys |
| 34 | Keyboard cover |
| 35 | Base plate |
| 40 | Switch |
| 41 | Key stem |
| 42 | Ellipsoidal reflector |
| 43 | Spring rest |
| 44 | Spring |
| 45 | Cover aperture |
| 46 | Base aperture |
| 47 | Stem guide |
| 48 | First fiber optic |
| 49 | Second fiber optic |
| 50 | Harness |
| 54 | Elliptical reflector |
| 55 | Harness |
| 56 | First fiber optics |
| 57 | Second fiber optics |
| 58 | Third fiber optics |
| 59 | Emission angle |
| 60 | Acceptance angle |
| 61–62 | Rays |
| 63 | Stem |
| 64 | Fiber optics |
| 65 | Elliptical reflector |
| 66 | Stem |
| 67 | Fiber optics |
| 68 | Elliptical reflector |
| 69 | Pivot |
| 70 | Channel reflector |
| 72 | Stem |
| 73 | Mask |
| 74 | Fiber optics |
| 75 | Ellipsoidal reflector |
| 81 | Light source |
| 82 | Reflector |
| 83 | Positive lens |
| 84 | Axicon lens |
| 85 | Fiber optic harness |
| 86 | Fiber optics |
| 87 | Switch |
| 88 | Six fiber bundles |
| 90–95 | Collector harnesses |
| 100–105 | Collector lenses |
| 110–115 | Phototransducers |
| 120 | Housing means |
| 121 | Optical tunnel |
| 122 | Inner harness |
| 123 | Sixty-four fiber optics |
| 124 | Outer harness |

GENERAL DESCRIPTION

Figure 1:
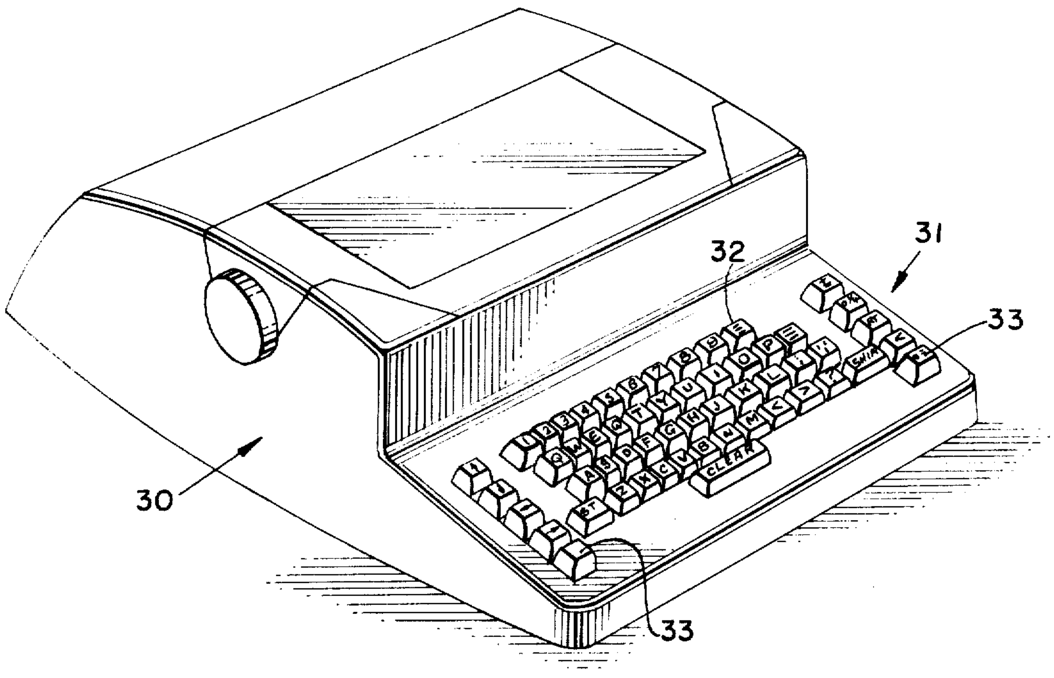
FIG. 1 is a perspective of a terminal incorporating the elements of this invention.
Figure 12:
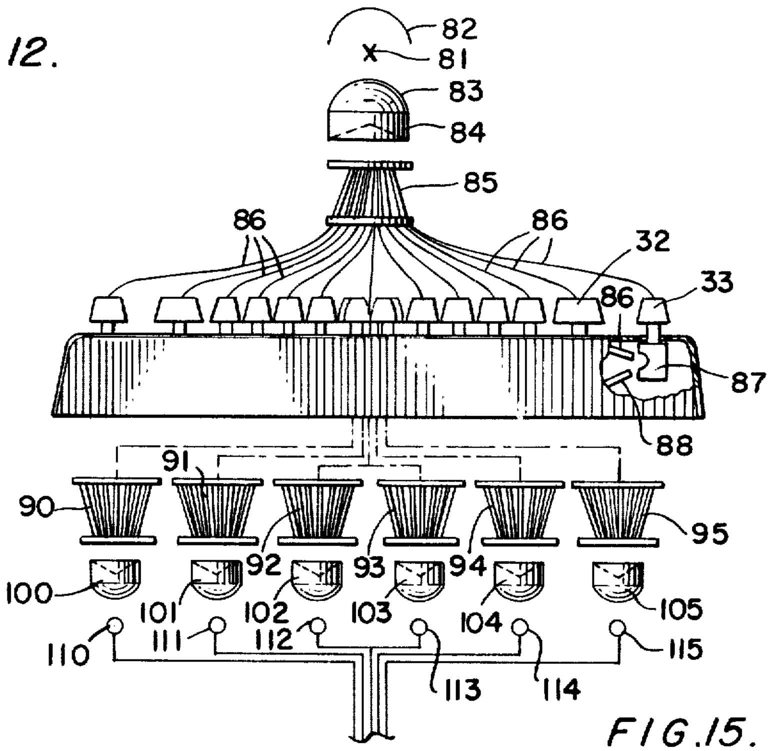
FIG. 12 is a schematic view of the operation of the optical system beginning with the single light source and ending with the generation of the signal indicative of the characater.

The operation of the optical keyboard may be described generally with relation to FIGS. 1 and 12. A conventional terminal 30 will have a keyboard 31, character keys 32, and special purpose keys 33. Beneath the keyboard will be a constant light source 81, an optical parabolic reflector 82, positive lens 83, and an axiconic lens 84 to distribute the light into a ring. Fiber optic harness 85 holds fibers 86 in position to receive the light and distribute them to individual keys 32, 33.

Each key has a switch 87 which couples the light to a bundle of six fiber optics 88, both shown elsewhere. These fibers are selectively connected to collector optic harnesses 90–95, which direct light onto axiconic collector lenses 100–105, focusing light on photoelectric transducers 110–115.

Through this arrangement, the light from source 81 may be transformed into a typically 6-bit signal, as is well known. For instance, such a signal might be

| | Phototransistors | | | | | |
|---|---|---|---|---|---|---|
| Character | 110 | 111 | 112 | 113 | 114 | 115 |

-Continued

| | Phototransistors | | | | | |
|---|---|---|---|---|---|---|
| a | on | on | on | on | on | on |
| b | on | on | on | on | on | off |
| c | on | on | on | on | off | off |
| (last) | off | off | off | off | off | on |

Various codes are standard in the industry and the disclosed invention may of course be adapted to any one of them.

The optical keyboard can also be illustrated by the following:

FLOW CHART

Light Source

Reflector

Positive Lens

Axicon Lens

Ring of Light

64 Fiber Optics

3 Fiber Optic Harness

Depressable Character Keys

Ellipsoidal Reflectors for Keys

6 Fiber Optics per Key

6 Fiber Optic Output Harnesses

6 Output Axicons

6 Phototransducers 6-bit Output Signal

THE AXICONIC LIGHT DISTRIBUTOR

The objective of this light distributor is to take the energy from a point source of light or from an ambient source of light and to distribute it equally into up to 64 fiber optic bundles. The conventional system for doing it at present is to attempt to focus the light on 64 bundles in close proximity. The present system will transfer the lilght more efficiently to the bundles, each bundle receiving approximately the same amount of light and therefore, the transfer will occur with much greater efficiency than in the conventional system.

The light distribution system will be explained with reference to FIGS. 25 through 31, which are schematic ray tracings, greatly exaggerated for clarity. Each of the drawings are to the same scale and include a point source of light P, positive lens PL having a focal distance *f* and positive cone PC and negative cone NC. The point source of light is shown disseminating four rays, *a*, *b*, *c* and *d*.

Figures 25, 26, 27, 28:
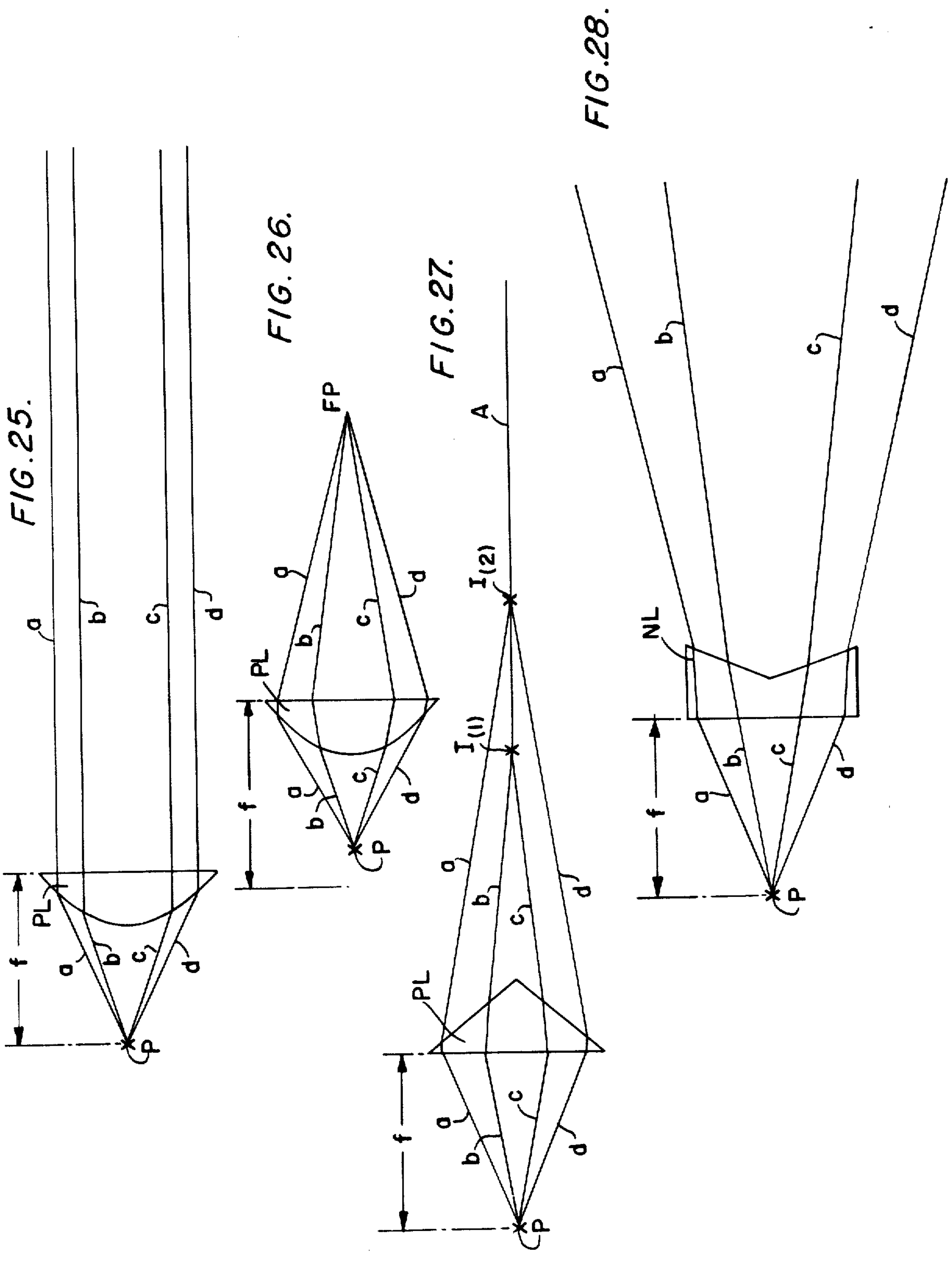
FIGS. 25–32 are ray tracings of various lens systems.

FIG. 25 shows a point source of light P at the focus the plane this positive lens PL. The positive lens transforms the diverging rays *a*, *b*, *c* and *d* into parallel rays which focus at infinity.

FIG. 26 shows the point source P inside the focal point of positive lens PL, refocusing the rays *a*, *b*, *c* and *d* onto point FP.

In FIG. 27, the point source of light P is directed onto theplane surface of a conical lens PC. The conical lens has the property that a point source P on the axis of revolution is imaged by the axicon to a range of points along the axis A, as illustrated I(1), I(2).

FIG. 28 shows a point source of light P shining onto the plane surface at the base of an axicon NC having a negative cone. Here the rays *a*, *b*, *c* and *d* of light are not focused but continually diverge as shown.

Figure 29:
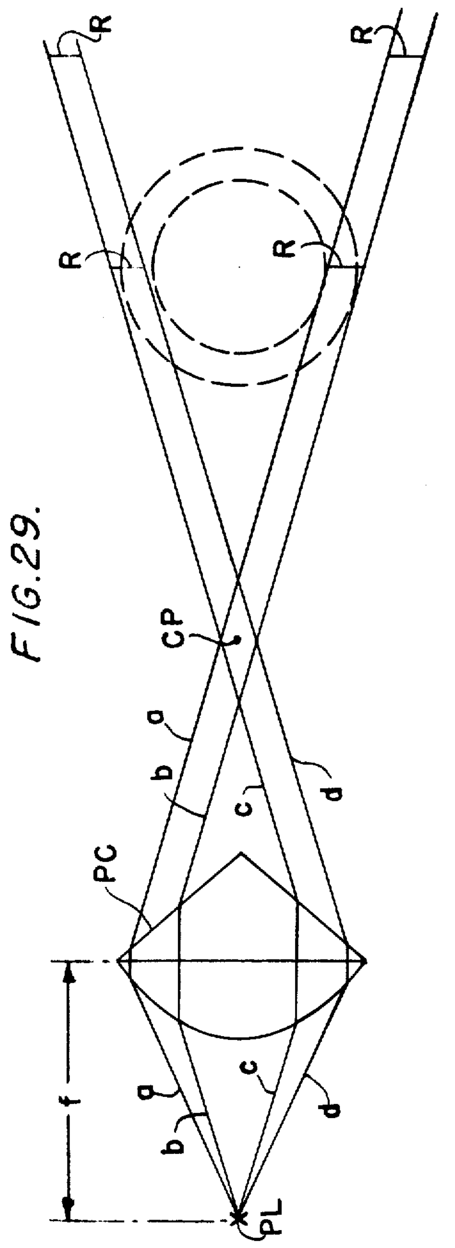

FIG. 29 shows a point source of light P at focal distance of the positive lens PL which is abutted to a positive cone axicon PC. The positive lens bends the rays of light into parallel alignment and they emerge from the positive cone in a parallel converging and then diverging cone. The ring of light at any point R is of approximate constant thickness depending on the spherical aberration of lens PL.

Figure 30:
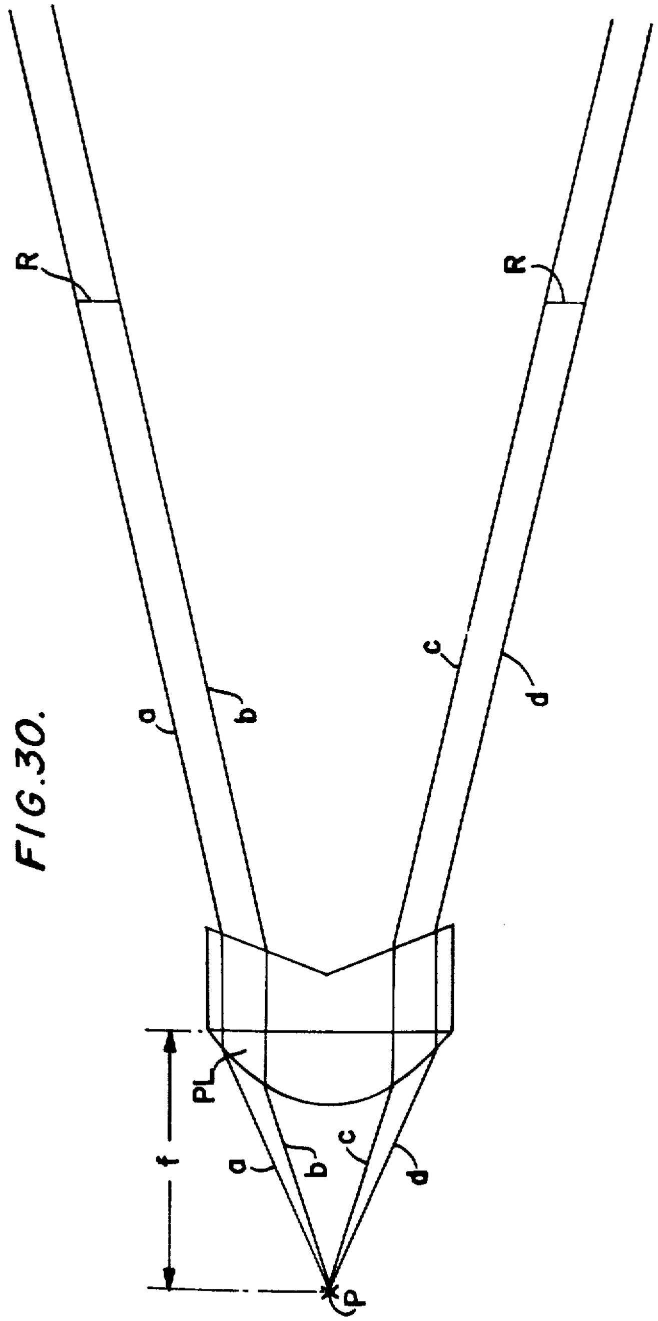

FIG. 30 shows the point source of light P at focal point of positive lens PL, which is abutted to a negative cone axicon NC. The positive cone transforms the diverging rays *a*, *b*, *c*,, and *d* into parallel rays and they emerge from the negative cone axicon in a diverging cone of similarly approximate constant thickness R.

Figures 31, 32:
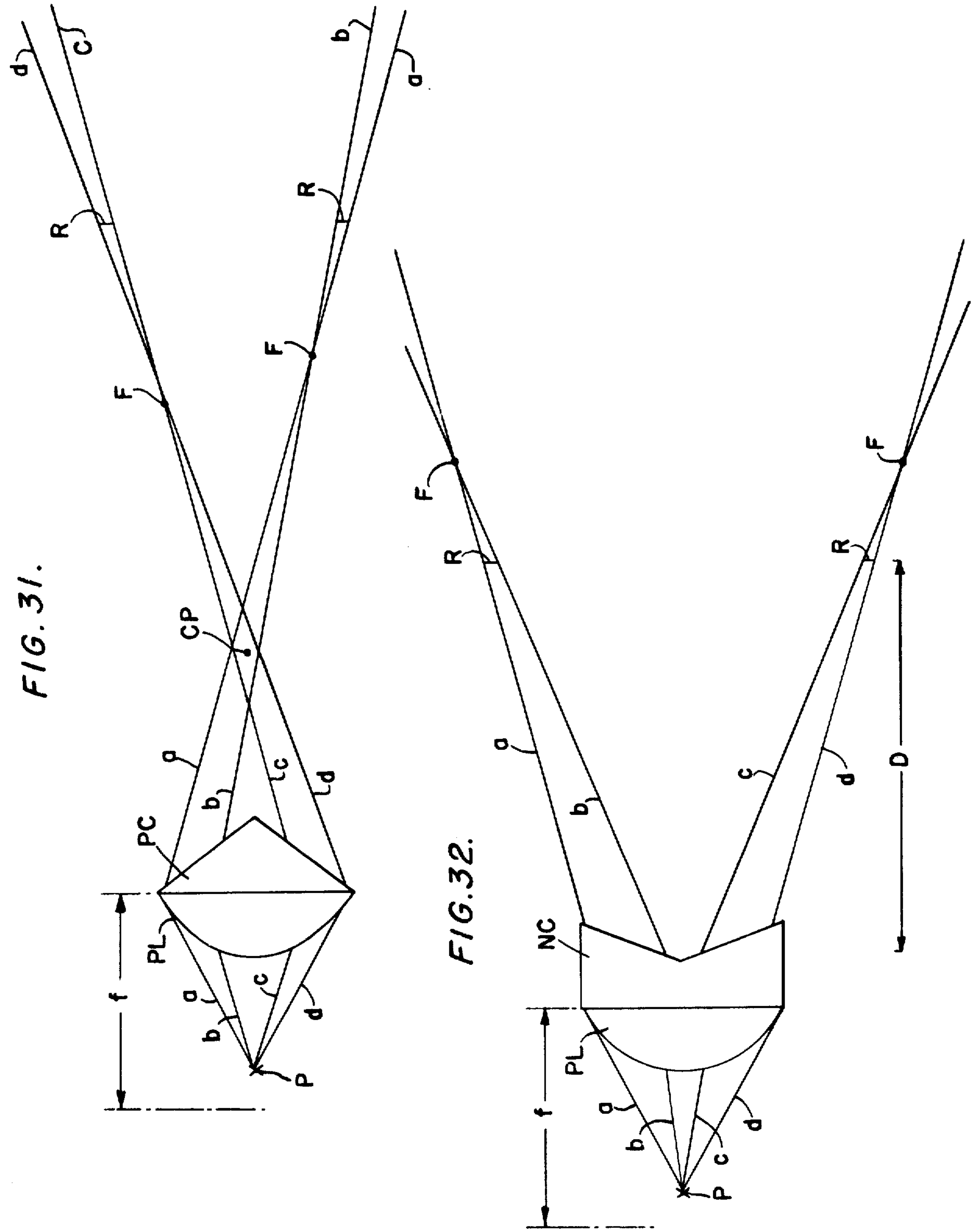

FIGS. 31 and 32 each show the point source of light P inside the focal distance *f* of the positive lens PL. In FIG. 31, the lens is abutted to a positive cone PC and in FIG. 32, is abutted to a negative cone NC.

As in FIG. 26, the positive lens converges the rays within the lens system. In FIG. 31, the rays emerge in a converging then diverging cone, forming a diverging ring R of increasing thickness past the point of approximate focus F.

In FIG. 32, the rays emerge from the negative cone in an expanding cone which approximately focuses at point F and forms a ring of light inside the focal point R of decreasing thickness, then of increasing thickness past point F.

PREFERRED EMBODIMENTS a. Light Distributor and Collector

The keyboard uses one distributor to take the energy from a single constant light source and distribute it typically to each of up to 64 keys. The light is then collected from each of these 64 keys suitably coded, and focused on each of 6 phototransducers. The light distributor and light collector lens systems operate in similar fashion so the single distributor and 6 collectors will be described here only once.

In FIGS. 6 and 7 is shown a working model of the light distributor. Suitable housing means 120 hold an optical tunnel 121 which has mounted in it light source 81, a positive lens 83 and a negative axicon lens 84. Also mounted in the tunnel is the inner harness 122 holding the inner ends of 64 fiber optics.

Outer harness 124, suitably mounted, holds the fiber optics at the desired angle, so that their ends are normal to the diverging rays of light from the lens system.

The geometrical relationship between the fiber optics 123 and harnesses 122 and 124 and the lens system 83 and 84 can be explained with reference to FIG. 32. The purpose is to locate the ring of fiber optics in the plane of the diverging cone defined by rays *a* and *b*, and rays *c* and at a distance D where the diameter of the optical ring R is equal to the diameter of the fiber optics to maximize the amount of light emerging from the lens systems which shines on the fiber optics. The angular inclination of the fiber optics should be such that their axes are in the ring of light, thus insuring maximum acceptance of the light.

Referring to FIG. 12, the output fibers from each of the character keys 32 will be placed in from 1 to 6 of the collector harnesses 90 through 95. The arrangement of these harnesses, the collector lens system, 100 through 105, and the phototransistors 110 through 115 are such that the light from any fiber optic in the collector harness is focused on the phototransistors. Since each fiber optic must supply sufficient energy to activate the phototransistors, and this system insures maximum equal coupling of energy from each fiber optic, the energy required in the fiber optic system is thus minimized.

b. The Reflector Switch

Each of the character keys 32 and the special purpose keys 33 have a similar optical switch which is here described for one character only.

Each key is bivalued in that it transmits one signal when in the raised position, and one signal in the lowered position.

The simplest system is to transmit a light signal when the key is lowered and to transmit no light signal when the key is raised. The preferred embodiment uses three fiber optics, transmitting a signal in one fiber optic when the key is raised and tranmitting a second signal in a different optic when the key is depressed. This preferred embodiment allows for an additional safety margin, practically eliminating erroneous signals, as is well known in the art.

Referring to FIGS. 2 through 5, a character key 32 has depending from it stem 41 spring rest 43, and stem guide 47. The stem 41 extends through aperture 45 in cover 34 and the stem guide 47 extends through aperture 46 in base plate 35.

Figure 2:
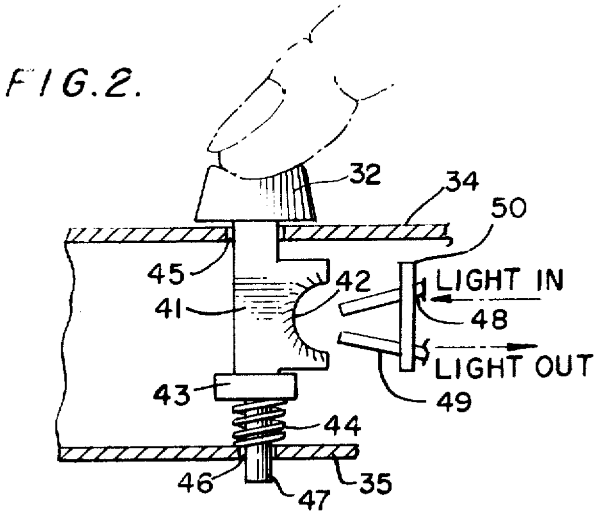
FIG. 2 is a cross-section of a typical key in its depressed position activating a two-element optical switch.
Figure 3:
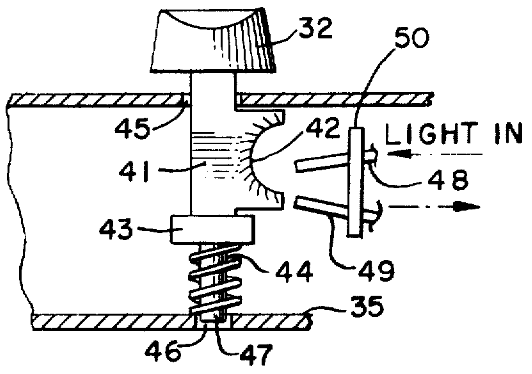
FIG. 3 is a view of the same key shown in FIG. 2 in the elevated or inoperative position.

As shown in FIGS. 2 and 3, the key is normally biased upwardly and may be depressed by the operator, until the key 32 contacts cover 34 or another stop.

Integral with the stem 41 is an ellipsoidal reflector 42, as shown in FIGS. 2 and 3 and rigidly mounted on the base 35 is harness 50, containing a first fiber optic 48 and second fiber optic 49. These fiber optics are so aligned that when the key is depressed the ends of the two fiber optics are at the focal points of the ellipsoidal reflector 42 and all of the light emanating from the first fiber optic 48 is coupled to the second fiber optic 49. At any other position, from the fully depressed position to the fully raised position as shown in FIG. 3, almost none of the light from fiber optic 48 is coupled to fiber optic 49. At the fully raised position one of the fibers is blocked by the shoulder of element 42 and no light is coupled.

Figure 4:
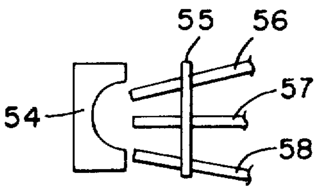
FIG. 4 is a partial cross-sectional view of a three-element optical switch in the upper position.
Figure 5:
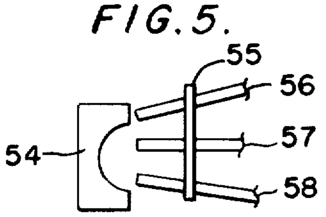
FIG. 5 is a view similar to FIG. 4 of the same switch in its lower position.

The three-way fiber optic switch is illustrated in FIGS. 4 and 5, and in successive enlargements in FIG. 9. The ellipsoidal reflector 54 moves from the raised position shown in FIGS. 4 and 9, to the lowered position shown in FIG. 5. Harness 55 holds fiber optics 56, 57 and 58 in a fixed position. When the reflector is in the raised position, input fiber 57 is at the lower of the focal points, and upper fiber 56 is at the upper of the focal points. All of the light emanating from fiber 57 is coupled to fiber 56. As shown, a light signal in fiber 56 would indicate the key is raised.

The reflector 54 moves a distance equal to the distance between the two focal points of the ellipsoidal reflector. When in the lowered position as illustrated in FIG. 5, the light from fiber 57 is coupled to fiber 58. This is designed to be compatible with the usual keyboard distance of one-eighth of an inch with a standard spring pressure of 4 or 5 inches. To ensure blocking the fiber at the "off" position the ellipsoid will have to be such that the distance $f_1$–$f_2$ shown in FIG. 10 is greater than the distance "x".

Figure 11:
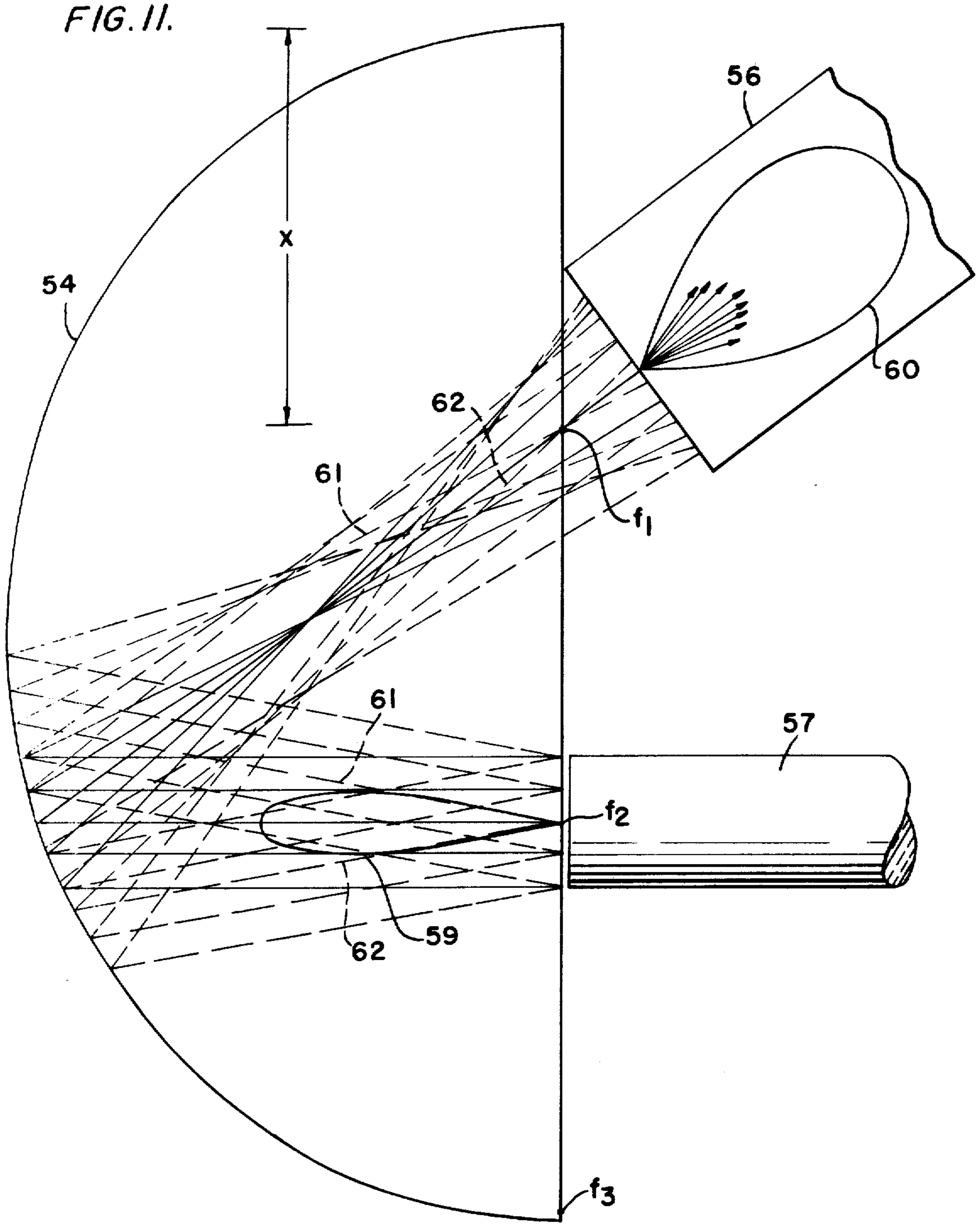
FIG. 11 is a view of an ellipsoidal reflector showing the relative intensities of the rays at small angles from the axis of the fiber optic.

The diagram in FIG. 11 while not to scale in that $f_1$–$f_2$ is less than "x" illustrates represents the symmetrical arrangement of the ellipsoidal reflector and the three fiber optic system. This arrangement takes advantage of a well-known geometrical principle that light emanating from one focal point, here $f(2)$, including diverging rays 61 and 62 will come together again at a focus at the other focal point $f(1)$ of the ellipse. From 57 other diverging rays come together again at 56.

As shown by the plot in FIG. 11 of intensity versus emission angle 59, from the input fiber 57, the rays emerge in an extremely well collimated path with virtually all of the energy within a few degrees of the extension of the axis of the fiber.

Fiber optics have an acceptance angle roughly twice as wide as their emission angle (Reference: *Applied Optics*, Vol. 10, No. 5, May 1971, Page 1,146) as shown by the plot of the acceptance angle 60 on output fiber 56. As can be seen from FIG. 11, virtually all of the energy from fiber 57 is coupled to fiber 56 when the reflector is in the position shown, when fiber 56 is about twice the diameter of fiber 57 which is the case in practice when 56 is a bundle of six or more fibers.

As will be immediately apparent to those skilled in optical technology, a slight relative movement of reflector 54 will decouple all of the energy from fiber 57 in fiber 56. As the reflector 54 moves to its lowered position, where points $f(2)$ and $f$ (3) become the focal points of the ellipse, the light energy emanating from fiber 56 will swing from position $f(1)$ to $f(3)$, a distance twice the movement of the reflector itself.

DESCRIPTION OF ALTERNATIVES a. The Distributor and Collector System

Figure 20:
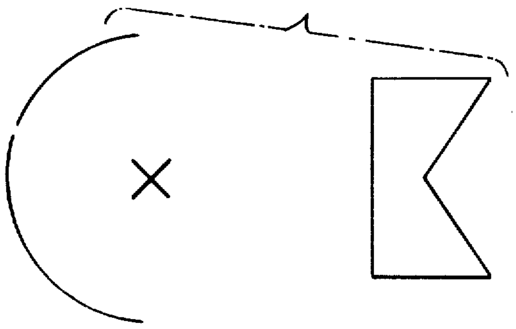
FIG. 20 is a schematic representation of a parabolic reflector, light source and negative axicon.
Figure 21:
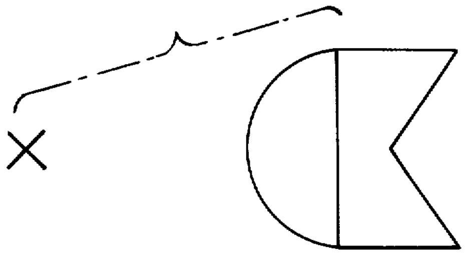
FIG. 21 is a schematic representation of a light source, positive lens and negative axicon.

The preferred embodiment of this lens system as illustrated in FIG. 32 produces a diverging cone of light of decreasing thickness, coming to an approximate focus and then further diverging. This is accomplished by the point source of light, positive lens and negative axicon as also illustrated in FIG. 21. The positive lens can be replaced by a parabolic mirror as shown in FIG. 20, to create parallel, or nearly parallel, rays of light.

Figure 22:
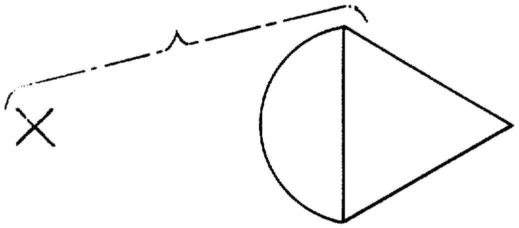
FIG. 22 is a schematic representation of a light source, positive lens and positive axicon.
Figure 24:
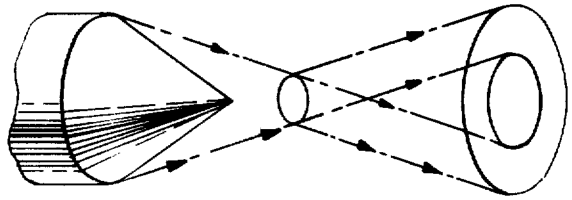
FIG. 24 is a schematic representation of the field of light emitted by a conical lens.

A positive cone lens may also be used in place of a negative cone lens as illustrated in FIGS. 22, 24 and 31.

Figure 23:
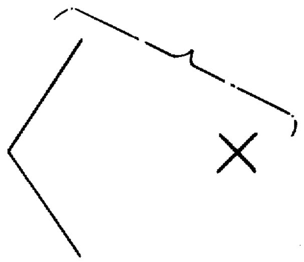
FIG. 23 is a schematic representation of a light source and reflective axicon.

A conical reflector may also be employed to create the diverging cone of light as shown in FIG. 23.

Referring to FIG. 12 harnesses 85 and 90 through 95 have been shown with ends of the fiber optics facing the apex of the cone and adapted to either receive a diverging cone of light as harness 85, or to transmit a converging cone of light as in harnesses 90 through 95.

An alternative system would have the fiber optic ends facing away from the apex and thus receiving a converging cone of light or transmitting a diverging cone of light.

With this alternative, it would be possible to mount the fiber optic harness, with reference to FIG. 31, inside the cross-over point CP of the rays instead of outside point CP or of the focus F at point R where the rays have diverged to form a ring of light equal to the diameter of the fiber optic bundles. This would then allow the positive cone lens as shown in FIG. 31 to be more compact as the harness in the lens system would be brought closer together. Likewise the ends of the fibers in FIG. 32 could be mounted inside or outside the focus F.

b. The Reflector Switch

Figure 17:
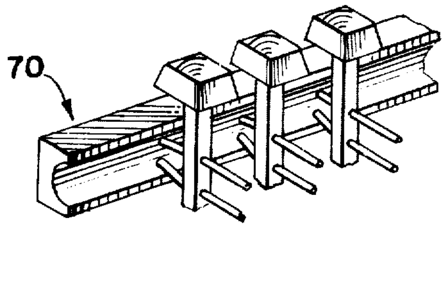
FIG. 17 is a view of a third alternative where a row of keys use a single elongated reflector.

As shown in FIG. 17 a channel reflector 70 may be used with an elliptical cross-section cavity. This reflector is limited by sideways scatter down the long axis of the channel.

Numerous mechanical arrangements of fiber optics and ellipsoidal reflectors would allow the energy to be coupled at one position of the key and decoupled at a second position of the key.

Figure 13:
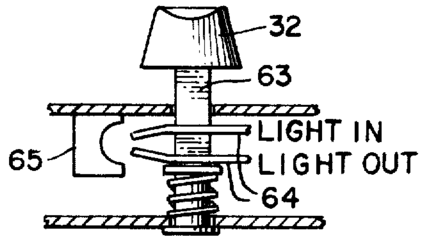
FIG. 13 is a view of an alternative light coupling system for a key with the key in the raised position.
Figure 14:
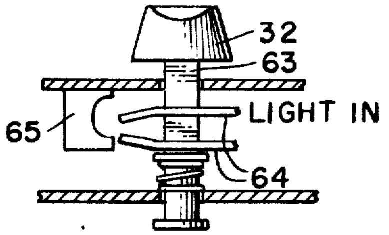
FIG. 14 is a view similar to FIG. 13, showing the key depressed and the fiber optics misaligned from the reflector, decoupling the light.

In FIGS. 13 and 14, key 32 has depending stem 63 carrying fiber optics 64 which are facing reflector 65. The reflector is rigidly mounted and when the operator depresses key 32 as shown, the two fiber optics move from the light coupling position, the focal points, to a non-coupling position.

Figure 15:
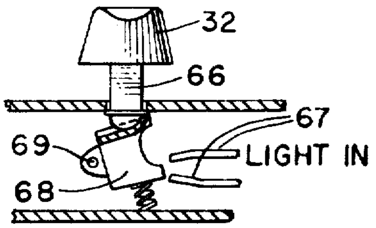
FIG. 15 is a second alternative of the key coupling system, showing a pivoted reflector.
Figure 16:
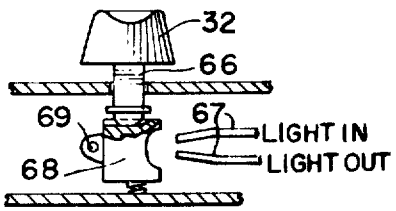
FIG. 16 is a view similar to FIG. 15, showing the pivoted reflector in the depressed or coupling position.

As shown in FIGS. 15 and 16, the fiber optics 67 for each key may be fixed and the key stem 66 may rotate reflector 68 around pivot 69. When depressed, reflector 68 is aligned so that the ends of fibers 67 shown in FIG. 16 are at the two focal points coupling light between them. As shown the axis of rotation of the reflector is horizontal but another configuration, not shown, would have the axis vertical.

Figure 18:
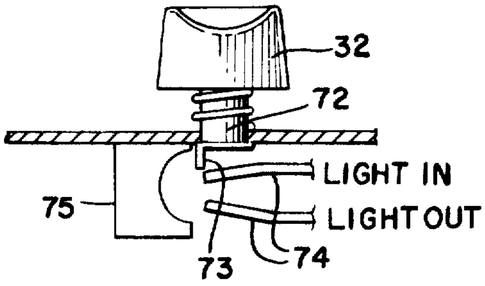
FIG. 18 is a fourth alternative for a key coupler showing the key with a light blocking element in a coupling.
Figure 19:
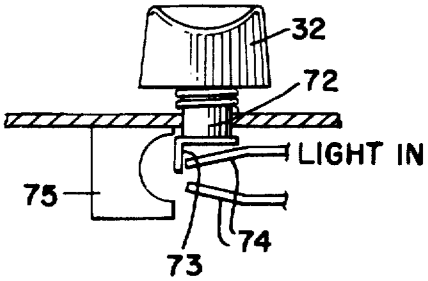
FIG. 19 is a view similar to FIG. 18 showing the key in a depressed and blocked position.

Another variation as shown in FIGS. 18 and 19 is to have both the ellipsoidal reflector 75 and the fiber optics 74 in fixed position. Character key 32 has a stem 72 and a mask 73. The fibers 74 are aligned at the focal point of the relfector 75. By depressing character key 32, the operator will merely mask the light from one fibre optic thus decoupling the system. Alternatively, the mask could block the light in the raised position and transmit light in the lowered position.

SPECIFIC EXAMPLE I

Axicon Light Distributing System

Light Source
- Philips bicycle tail lamp — 40 mm at 1.5 volts
- distance to vertex of lens — 45 mm Positive Lens
- focal length — 76 mm
- diameter — 76 mm Conical Lens
- material — plastic acrylic
- index of refraction — 1.45
- diameter — 76 mm
- height of cone — 9.5 mm
- central angle of cone — 152°

Emitted Light
- distance from light source — 120 mm
- thickness of ring — 0.08 inch
- diameter of ring — 38 mm Fiber Bundles
- number — 36
- type — Crofon 1310
- fibers per bundle — 32
- diameter of fiber — 0.01 inch

SPECIFIC EXAMPLE II

Keyboard for Airline Reservation Terminal

Keyboard
- Keys — 56
- Key travel — 0.125 inch
- Key bias — 3.0 ounces

Light
- Type — Philips bicycle tail lamp model 7121D
- Voltage — one half rated voltage 3.0 volt
- Current — 30 milliamps
- Output — under 0.005 milliwatts/$cm^2$ Distributor Lens System
- Type — plano-convex
- Diameter — 4.8 mm
- Focal length — 57 mm
- Type — negative axicon
- Index — 1.56
- Diameter — 48 mm
- Material — plastic acrylic
- Angular refraction — 14°

Distances
- Source to lens vertex — 45 mm
- Ring of light diameter — 46 mm
- Thickness of ring — 3 mm
- Axicon lens to ring — 120 mm Fibers
- Type — Dupont Crofon
- Size — 1 mm diameter Three Fiber Switch
- Input fiber diameter — 0.04 inch
- Output fiber diameter — 0.08 inch
- Inclination of output fiber — 35°

Ellipsoidal Reflector
- Material — acrylic plastic
- Shape — semi prolate ellipsoid
- Major axis — vertical
- Major axis — 0.375 inch
- Minor axis — 0.352 inch
- Distance between axes — 0.125 inch Coating — highly reflective (aluminum or rhodium or other)

Output

Number — six phototransistors

Type — Fairchild FPT 120A

Active surface — 1.50 sq mm

Minimum fiber light output to operate phototransistor — 0.1 foot candle

I claim:

1. A terminal for producing coded multi-bit signals comprising, a. a keyboard having a plurality of character and special purpose keys, b. a point source of light coupled to a plurality of input bundles of fiber optics, each bundle corresponding to a key, said coupling means including an axicon lens, c. an ellipsoidal bivalued switch associated with each key, said switch selectively coupling light between an input fiber bundle to an output bundle of fiber optics, d. for each key, said input fiber bundle and output fiber bundle spaced apart the distance between the foci of said reflector, e. said output fiber bundle from each of said keys selectively connected in coded relationship with a plurality of phototransducers, f. the ends of each fiber optic associated with each phototransducer coupled through an axicon lens onto said phototransducer.

2. A terminal for producing coded 7-bit signals for a keyboard having approximately 60 special purpose and character keys comprising, a. a point source of light, b. the light emanating from said point source onto the curved surface of a positive lens, c. said rays being converged by said positive lens, d. the light emanating from the positive lens onto the flat surface of a negative axicon lens, e. said negative axicon lens diverging said rays of light into a ring of light, f. the width of said ring of light converging to approximately the thickness of a fiber optic element, g. a plurality of optical fibers equal in number to said keys, the ends of said fibers in said ring of light at said point of convergence, h. said fibers each inputs to a switching system associated with each key, i. an ellipsoidal reflector associated with and laterally displaceable by each key over a distance equal to the distance between the foci of said ellipse, j. the distance between the foci being in excess of one third of the distance of the major axis of the ellipsoid, k. the input fiber for a reflector being located at one focus of the ellipsoid when the reflector is displaced in one direction and being located at the other focus when the reflector is displaced in the other direction, l. a pair of output optical fibers associated with each key, each located on opposite sides of the input fiber and spaced the focal distance of said ellipsoid from said input fiber, m. one output fiber bundle located at the other focus than the input fiber when the reflector is displaced in a first direction, and the other output fiber located at the other focus than the input fiber when the reflector is displaced in the other direction, n. the output fibers each containing between 1 and 7 fiber optics, o. the output fibers selectively coupled in coded relationship to seven photoelectric transducers, p. the ends of the fibers associated with a photoelectric transducer being in a ring producing a converging cone of light, q. said converging cone of light impinging upon an axicon lens, r. said axicon lens diverging said rays into a ring of parallel rays, s. said parallel rays of light impinging upon a positive lens, t. said positive lens focusing said rays of light upon said phototransducer.

* * * * *